United States Patent
Destro et al.

(10) Patent No.: US 10,550,212 B2
(45) Date of Patent: Feb. 4, 2020

(54) CONTAINERS COMPRISING PROPYLENE-BASED TERPOLYMERS

(71) Applicant: BASELL POLIOLEFINE ITALIA S.R.L., Milan (IT)

(72) Inventors: Mara Destro, Ferrara (IT); Marco Ciarafoni, Ferrara (IT); Paola Massari, Ferrara (IT); Tiziana Caputo, Ferrara (IT); Thomas Bohm, Darmstadt (DE)

(73) Assignee: Basell Poliolefine Italia S.r.l., Milan (IT)

( * ) Notice: Subject to any disclaimer, the term of this patent is extended or adjusted under 35 U.S.C. 154(b) by 244 days.

(21) Appl. No.: 15/511,976

(22) PCT Filed: Sep. 9, 2015

(86) PCT No.: PCT/EP2015/070528
§ 371 (c)(1),
(2) Date: Mar. 16, 2017

(87) PCT Pub. No.: WO2016/045962
PCT Pub. Date: Mar. 31, 2016

(65) Prior Publication Data
US 2017/0291972 A1    Oct. 12, 2017

(30) Foreign Application Priority Data
Sep. 24, 2014   (EP) .................... 14186233

(51) Int. Cl.
| | | |
|---|---|---|
| *B65D 1/02* | (2006.01) | |
| *C08F 2/00* | (2006.01) | |
| *C08F 210/06* | (2006.01) | |
| *C08F 4/646* | (2006.01) | |
| *C08F 4/654* | (2006.01) | |
| *C08F 210/08* | (2006.01) | |
| *C08F 210/16* | (2006.01) | |

(52) U.S. Cl.
CPC .......... *C08F 210/06* (2013.01); *B65D 1/0207* (2013.01); *C08F 2/001* (2013.01); *C08F 4/6465* (2013.01); *C08F 4/6545* (2013.01); *C08F 210/08* (2013.01); *C08F 210/16* (2013.01); *C08F 2500/12* (2013.01)

(58) Field of Classification Search
CPC .... C08F 210/06; C08F 210/14; C08F 210/08; C08F 210/02; B29C 49/005; B65D 1/02; B65D 1/0207; B65D 1/0215; C08L 23/08; C08L 23/0807; C08L 23/0815; C08L 23/10; B29K 2023/10; Y10T 428/13; Y10T 428/1352; Y10T 428/1397
USPC ................ 526/348, 348.5, 348.6; 428/35.7; 252/240
See application file for complete search history.

(56) References Cited

U.S. PATENT DOCUMENTS

| | | | |
|---|---|---|---|
| 6,388,040 B1 | 5/2002 | Fujita et al. | |
| 2009/0274921 A1* | 11/2009 | Ackermans | B32B 27/32 428/516 |
| 2010/0247375 A1 | 9/2010 | Grein et al. | |
| 2011/0293869 A1 | 12/2011 | Myhre et al. | |

FOREIGN PATENT DOCUMENTS

| | | | |
|---|---|---|---|
| CN | 101484483 A | 7/2009 | |
| CN | 101573231 A | 11/2009 | |
| CN | 102131838 A | 7/2011 | |
| EP | 1941997 A1 | 7/2008 | |
| EP | 2666793 A1 | 11/2013 | |
| WO | WO-0244251 A1 * | 6/2002 | ............. B32B 27/32 |

OTHER PUBLICATIONS

Fink, Johannes Karl, Reactive Polymer: Fundamentals and Applications: A Concise Guide to Industrial Polymers, 2nd Edition, William Andrews, 2013, pp. 411-412 (Year: 2013).*
PCT International Search Report and Written Opinon dated Oct. 28, 2015 (Oct. 28, 2015) for Corresponding PCT/EP2015/070528.

* cited by examiner

*Primary Examiner* — Lee E Sanderson

(57) ABSTRACT

The present disclosure provides an article of manufacture made from or containing a propylene-based terpolymer, having
 (i) ethylene-derived units in the range from about 0.5 wt. % to about 1.8 wt. %;
 (ii) 1-butene-derived units in the range from about 1.5 wt. % to about 2.5 wt. %;
 (iii) a ratio of $C_2$ wt %/$C_4$ wt % in the range from about 0.40 to about 0.80, wherein $C_2$ wt % is the weight percent of ethylene-derived units and $C_4$ wt % is the weight percent of 1-butene-derived units;
 (iv) a melt flow rate in the range from about 30 g/10 min to about 80 g/10 min;
 (v) a xylene soluble fraction at 25° C. lower than about 5.0 wt. %; and
 (vi) a melting point higher than about 140° C.
The article can be a container, which can be used for food applications.

7 Claims, No Drawings ature and related narrow processability window.
CONTAINERS COMPRISING PROPYLENE-BASED TERPOLYMERS This application is the U.S. National Phase of PCT International Application PCT/EP2015/070528, filed Sep. 9, 2015, claiming benefit of priority to European Patent Application No. 14186233.4, filed Sep. 24, 2014, the contents of which are incorporated herein by reference in its entirety.

FIELD OF THE INVENTION

In general, the present disclosure relates to the field of chemistry. More specifically, the present disclosure relates to an article of manufacture made from or containing an olefinic polymer. In particular, the present disclosure relates to a container made from or containing a propylene/ethylene/1-butene terpolymer.

BACKGROUND OF THE INVENTION

Propylene terpolymers can be used to make articles of manufacture. It can be difficult to balance the properties of impact, rigidity, and transparency. For example, when softness is desired, the property may indicate a high fraction of xylene solubles is appropriate, rendering the articles not useful for food contact applications.

Also, some processes for making the propylene terpolymers can yield terpolymers having a low melting temperature and related narrow processability window.

BRIEF SUMMARY OF THE INVENTION

The present disclosure provides an article of manufacture made from or containing a propylene-based terpolymer.

In general embodiments, the article of manufacture is made from or contains a propylene-based terpolymer made from propylene monomers, ethylene monomers, and 1-butene monomers, having
(i) ethylene-derived units in the range from about 0.5 wt. % to about 1.8 wt. % ($C_2$ wt %), based upon the total weight of the propylene-based terpolymer;
(ii) 1-butene-derived units in the range from about 1.5 wt. % to about 2.5 wt. % ($C_4$ wt %), based upon the total weight of the propylene-based terpolymer;
(iii) a ratio of $C_2$ wt %/$C_4$ wt % in the range from about 0.40 to about 0.80, wherein $C_2$ wt % is the weight percent of ethylene-derived units and $C_4$ wt % is the weight percent of 1-butene-derived units;
(iv) a melt flow rate, MFR measured according to ISO 1133, 230° C., 2.16 kg is in the range from about 30 g/10 min to about 80 g/10 min;
(v) a xylene soluble fraction at 25° C. lower than about 5.0 wt. %, based upon the total weight of the propylene-based terpolymer; and
(vi) a melting point higher than about 140° C.

In general embodiments, the article is a container. In some embodiments, the container is used for food applications.

In general embodiments, the present disclosure provides a propylene-based terpolymer made from propylene monomers, ethylene monomers, and 1-butene monomers, having
(i) ethylene-derived units in the range from about 0.5 wt. % to about 1.8 wt. % ($C_2$ wt %), based upon the total weight of the propylene-based terpolymer;
(ii) 1-butene-derived units in the range from about 1.5 wt. % to about 2.5 wt. % ($C_4$ wt %), based upon the total weight of the propylene-based terpolymer;
(iii) a ratio of $C_2$ wt %/$C_4$ wt % in the range from about 0.40 to about 0.80, wherein $C_2$ wt % is the weight percent of ethylene-derived units and $C_4$ wt % is the weight percent of 1-butene-derived units;
(iv) a melt flow rate, MFR measured according to ISO 1133, 230° C., 2.16 kg is in the range from about 30 g/10 min to about 80 g/10 min;
(v) a xylene soluble fraction at 25° C. lower than about 5.0 wt. %, based upon the total weight of the propylene-based terpolymer; and
(vi) a melting point higher than about 140° C.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

DETAILED DESCRIPTION OF THE INVENTION

The present invention now will be described more fully hereinafter. However, this invention can be embodied in many different forms and should not be construed as limited to the embodiments set forth herein; rather, these embodiments are provided so that this disclosure will satisfy applicable legal requirements. As such, it will be apparent to those skilled in the art that the embodiments can incorporate changes and modifications without departing from the general scope. It is intended to include all the modifications and alterations in so far as the modifications and alterations come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, and so forth, are to be understood as being modified by the term "about". Also, ranges include any combination of the maximum and minimum points disclosed and include any intermediate ranges therein, which may or may not be specifically enumerated herein.

Definitions

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that can be used herein include "second," "third," "fourth," etc.

In the present description, the term "homopolymer" as used herein is consistent with its ordinary meaning. To the extent that a homopolymer can contain one or more monomeric units, the incorporation of any additional monomeric units has no measurable effect on the polymer's primary, secondary or tertiary structure or no effect on the polymer's physical or chemical properties. In other words, there is no measurable difference between a polymer comprising 100 weight percent of a first monomeric unit, and a co-polymer that includes more than one monomeric units.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., —$CH_2$—$CH_2$—, and not the monomer itself, e.g., $CH_2$=$CH_2$.

In the present description, the term "polymer" means a macromolecular compound prepared by polymerizing monomers of the same or different type. The term "polymer" includes homopolymers, copolymers, terpolymers, interpolymers, and so on.

In the present description, the term "terpolymer" means a polymer containing propylene, ethylene and 1-butene derived units, wherein the sum of these three comonomers derived units content being 100 wt. %, based upon the total weight of the polymer.

The present disclosure provides an article of manufacture made from or containing a propylene-based terpolymer.

In general embodiments, the article of manufacture is made from or contains a propylene-based terpolymer made from propylene monomers, ethylene monomers, and 1-butene monomers, having
(i) ethylene-derived units in the range from about 0.5 wt. % to about 1.8 wt. % ($C_2$ wt %), based upon the total weight of the propylene-based terpolymer;
(ii) 1-butene-derived units in the range from about 1.5 wt. % to about 2.5 wt. % ($C_4$ wt %), based upon the total weight of the propylene-based terpolymer;
(iii) a ratio of $C_2$ wt %/$C_4$ wt % in the range from about 0.40 to about 0.80, wherein $C_2$ wt % is the weight percent of ethylene-derived units and $C_4$ wt % is the weight percent of 1-butene-derived units;
(iv) a melt flow rate, MFR measured according to ISO 1133, 230° C., 2.16 kg is in the range from about 30 g/10 min to about 80 g/10 min;
(v) a xylene soluble fraction at 25° C. lower than about 5.0 wt. %, based upon the total weight of the propylene-based terpolymer; and
(vi) a melting point higher than about 140° C.

In some embodiments, the ethylene-derived units are in the range from about from 0.7 wt % to about 1.5 wt. %. In other embodiments, the ethylene-derived units are in the range from about 0.9 wt. % to about 1.3 wt. %.

In some embodiments, the 1-butene-derived units are in the range from about from about 1.6 wt. % to about 2.4 wt. %. In other embodiments, the 1-butene-derived units are in the range from about 1.7 wt. % to about 2.3 wt. %.

In some embodiments, the ratio of C2 wt %/C4 wt % is in the range from about 0.50 to about 0.70. In other embodiments, the ratio of C2 wt %/C4 wt % is in the range from 0.52 to 0.60.

In some embodiments, the melt flow rate is in the range from about 35 g/10 min to about 70 g/10 min. In other embodiments, the melt flow rate is in the range from about 40 g/10 min to about 68 g/10 min.

To achieve the MFR of the terpolymer, visbreaking can be used. Peroxides can be used as visbreaking agents.

In some embodiments, the xylene soluble fraction is lower than about 4.0 wt. %.

In some embodiments, the melting point is in the range from 140° C. to about 152° C. In other embodiments, the melting point is in the range from about 141° C. to about 148° C.

In some embodiments, the propylene-based terpolymer has a fraction soluble in hexane on powder (measured on film according to FDA 21 77:1520) lower than about 3.4 wt. %, based upon the total weight of the propylene-based terpolymer. In other embodiments, the hexane soluble fraction is lower than about 3.0 wt. %. In particular embodiments, the hexane soluble fraction is lower than about 1.8 wt. %.

In some embodiments, the propylene-based terpolymer has haze measured on 1 mm plaque lower than about 15%. In other embodiments, the haze is lower than about 13.0%. In particular embodiments, the haze is lower than about 12%.

In some embodiments, the terpolymers have a stereoregularity of isotactic type of the propylenic sequences.

The terpolymer for the container of the present disclosure can be prepared by polymerization in one or more polymerization steps. Such polymerization can be carried out in the presence of Ziegler-Natta catalysts. A component of the catalysts is a solid catalyst component made from or containing a titanium compound having at least one titanium-halogen bond, and an electron-donor compound, both supported on a magnesium halide in active form. Another component (co-catalyst) is an organoaluminum compound, such as an aluminum alkyl compound.

An external donor can be added.

In some embodiments, the catalysts used in the process of the disclosure can be used to produce polypropylene homopolymer with a value of xylene insolubility at ambient temperature greater than about 90%, based upon the total weight of the polypropylene homopolymer. In some embodiments, the catalysts can produce polypropylene homopolymers having a value of xylene insolubility greater than about 95%.

Examples of the useful catalysts are described in U.S. Pat. Nos. 4,399,054, 4,472,524, and European Patent No. 45977.

The solid catalyst components can be made from or contain compounds selected from the group consisting of ethers, ketones, lactones, compounds containing N, P and/or S atoms, and esters of mono- and dicarboxylic acids, as electron-donors (internal donors).

In some embodiments, the electron-donor compounds are esters of phthalic acid and 1,3-diethers of formula:

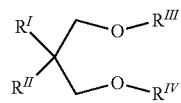

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, the structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European Patent Application No. 361493 and European Patent Application No. 728769.

Representative examples of the diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

Other electron-donor compounds are phthalic acid esters, such as diisobutyl, dioctyl, diphenyl and benzylbutyl phthalate.

It is also possible to use mixture of at least two electron donor compounds, one of which being present in an amount from 30 to 90% by mol with respect to the total amount of donors and selected from succinates and the other being selected from 1,3 diethers.

The preparation of the catalyst component can be carried out according to various methods.

For example, a $MgCl_2 \cdot nROH$ adduct (in the form of spheroidal particles) wherein n can be from 1 to 3 and ROH is ethanol, butanol or isobutanol, is reacted with an excess of $TiCl_4$ containing the electron-donor compound. The reaction temperature can be from 80 to 120° C. The solid is then isolated and reacted once more with $TiCl_4$, in the presence or absence of the electron-donor compound, after which it is separated and washed with aliquots of a hydrocarbon until the chlorine ions have disappeared.

In the solid catalyst component, the titanium compound can be present in an amount from 0.5 to 10% by weight. The quantity of electron-donor compound which remains fixed on the solid catalyst component can be from 5 to 20% by moles with respect to the magnesium dihalide.

The titanium compounds can be halides or halogen alcoholates of titanium. An example is titanium tetrachloride.

The reactions described can result in the formation of a magnesium halide in active form. Other reactions can cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups.

The Al-alkyl compound can be used in such a quantity that the Al/Ti ratio is from 1 to 1000.

The electron-donor compounds that can be used as external donors include aromatic acid esters such as alkyl benzoates, and silicon compounds containing at least one Si—OR bond, where R is a hydrocarbon radical.

Examples of silicon compounds are (tert-butyl)$_2$Si(OCH$_3$)$_2$, (cyclohexyl)(methyl)Si(OCH$_3$)$_2$, (cyclopentyl)$_2$Si(OCH$_3$)$_2$ and (phenyl)$_2$Si(OCH$_3$)$_2$ and (1,1,2-trimethylpropyl)Si(OCH$_3$)$_3$.

1,3-diethers having the formulae described above can also be used. If the internal donor is one of these diethers, the external donors can be omitted.

In some embodiments, the terpolymers are prepared by using catalysts containing a phthalate as internal donor and (cyclopentyl)$_2$Si(OCH$_3$)$_2$ as outside donor, or the 1,3-diethers as internal donors.

In some embodiments, the propylene-ethylene-butene-1 polymers disclosed herein can be produced with a polymerization process illustrated in European Patent Application No. 1 012 195.

In detail, the process can contain the steps of (a) feeding the monomers to polymerization zones in the presence of catalyst under reaction conditions, (b) collecting the polymer product from the polymerization zones, (c) growing polymer particles flow upward through one (first) of the polymerization zones (riser) under fast fluidization conditions, (d) leaving the riser, (e) entering another (second) polymerization zone (downcomer) through which the reactor components flow downward in a densified form under the action of gravity, (f) leaving the downcomer, and (g) reintroducing into the riser, thereby establishing a circulation of polymer between the riser and the downcomer.

In the downcomer, high values of density of the solid are reached, which approach the bulk density of the polymer. A positive gain in pressure can thus be obtained along the direction of flow, so that it becomes possible to reintroduce the polymer into the riser without additional mechanical devices. In this way, a "loop" circulation is set up, which is defined by the balance of pressures between the two polymerization zones and by the head loss introduced into the system.

The condition of fast fluidization in the riser is established by feeding a gas mixture made from or containing the relevant monomers to the riser. The feeding of the gas mixture can be effected below the point of reintroduction of the polymer into the riser by the use of a gas distributor. The velocity of transport gas into the riser can be higher than the transport velocity under the operating conditions. In some embodiments, the velocity is in the range from 2 to 15 m/s.

The polymer and the gaseous mixture leaving the riser can be conveyed to a solid/gas separation zone. The solid/gas are separated. From the separation zone, the polymer enters the downcomer. The gaseous mixture leaving the separation zone is compressed, cooled and transferred. In some embodiments, the gaseous mixture is admixed with make-up monomers and/or molecular weight regulators and returned to the riser. The transfer can be effected by a recycle line for the gaseous mixture.

The control of the polymer circulating between the two polymerization zones can be effected by metering the amount of polymer leaving the downcomer by controlling the flow of solids. In some embodiments, the control is provided by mechanical valves.

In some embodiments, the operating parameters are used in other olefin polymerization processes. For example, the temperature can be between 50 to 120° C.

In some embodiments, the first stage process can be carried out under operating pressures of between 0.5 and 10 MPa. In other embodiments, the operating pressure can be between 1.5 to 6 MPa.

In some embodiments, one or more inert gases are maintained in the polymerization zones, in such quantities that the sum of the partial pressure of the inert gases can be between 5 and 80% of the total pressure of the gases. The inert gas can be nitrogen or propane, for example.

The various catalysts are fed up to the riser at any point of the riser. However, the catalysts can also be fed at any point of the downcomer. The catalysts can be in any physical state; therefore, catalysts can be used in solid or liquid state.

Additives, fillers and pigments can be added, such as nucleating agents, extension oils, mineral fillers, and other organic and inorganic pigments. In some embodiments, the addition of inorganic fillers, such as talc, calcium carbonate and mineral fillers, can modify mechanical properties, such as flexural modulus and HDT. In some embodiments, talc can be used as a nucleating agent.

In some embodiments, nucleating agents can be added in quantities ranging from 0.05 to 2% by weight, based upon the total weight of the polymer composition. In other embodiments, nucleating agents can be added in amount from 0.1 to 1% by weight.

In general embodiments, the article is a container. In some embodiments, the container is used for food applications.

The container of the present disclosure can be endowed with a low value of haze. In some embodiments, the haze (in a container having 0.4 mm wall thick) is lower than 7.5%. In other embodiments, the haze is lower than 7.0%.

In some embodiments, the top load of a container having 0.4 mm wall thick is higher than 250 N. In other embodiments, the top load is higher than 300 N.

The container of the present disclosure can be obtained with in a variety of methods, including injection molding.

In some embodiments, the container can have various shapes, including cubic, conic, or irregular shapes for example.

In general embodiments, the present disclosure provides a propylene-based terpolymer made from propylene monomers, ethylene monomers, and 1-butene monomers, having
(i) ethylene-derived units in the range from about 0.5 wt. % to about 1.8 wt. % ($C_2$ wt %), based upon the total weight of the propylene-based terpolymer;
(ii) 1-butene-derived units in the range from about 1.5 wt. % to about 2.5 wt. % ($C_4$ wt %), based upon the total weight of the propylene-based terpolymer;
(iii) a ratio of $C_2$ wt %/$C_4$ wt % in the range from about 0.40 to about 0.80, wherein $C_2$ wt % is the weight percent of ethylene-derived units and $C_4$ wt % is the weight percent of 1-butene-derived units;
(iv) a melt flow rate, MFR measured according to ISO 1133, 230° C., 2.16 kg is in the range from about 30 g/10 min to about 80 g/10 min;
(v) a xylene soluble fraction at 25° C. lower than about 5.0 wt. %, based upon the total weight of the propylene-based terpolymer; and
(vi) a melting point higher than about 140° C.

Examples

The following examples are included to demonstrate embodiments. It should be appreciated by those of skill in the art that the techniques disclosed in the examples which follow represent techniques discovered to function well, and thus can be considered to constitute exemplary modes of practice. However, those of skill in the art should, in light of the present disclosure, appreciate that many changes can be made in the specific embodiments which are disclosed and still obtain a like or similar result without departing from the spirit and scope of this disclosure.

Determination of the Comonomer Content:

The comonomers content have been determined by infrared spectroscopy by collecting the IR spectrum of the sample versus an air background with a Fourier Transform Infrared spectrometer (FTIR). The instrument data acquisition parameters are:
purge time: 30 seconds minimum
collect time: 3 minutes minimum
apodization: Happ-Genzel
resolution: 2 cm-1

Sample Preparation:

Using a hydraulic press, a thick sheet is obtained by pressing about 1 g of sample between two aluminum foils. A small portion is cut from this sheet to mold a film. Film thickness ranges between 0.02:0.05 cm (8-20 mils).

Pressing temperature is 180±10° C. and about 10 kg/cm2 pressure for about one minute. Release the pressure and remove from the press and cool the sample to room temperature.

The spectrum of a pressed film of the polymer is recorded in absorbance versus wavenumbers (cm-1). The following measurements are used to calculate ethylene and 1-butene content:

Area (At) of the combination absorption bands between 4482 and 3950 cm-1, which is used for spectrometric normalization of film thickness.

Area (AC2) of the absorption band between 750-700 cm-1 after two proper consecutive spectroscopic subtractions of an isotactic non-additive polypropylene spectrum and then of a reference spectrum of an 1-butene-propylene random copolymer in the range 800-690 cm-1.

Height (DC4) of the absorption band at 769 cm-1 (maximum value), after two proper consecutive spectroscopic subtractions of an isotactic non-additive polypropylene spectrum and then of a reference spectrum of an ethylene-propylene random copolymer in the range 800-690 cm-1.

To calculate the ethylene and 1-butene content calibration, straight lines for ethylene and 1-butene can be obtained by using samples with known amounts of ethylene and 1-butene:

Calibration of ethylene: A calibration straight line is obtained by plotting AC2/At versus ethylene molar percent (% C2m). The slope GC2 is calculated from a linear regression.

Calibration of 1-butene: A calibration straight line is obtained by plotting DC4/At versus butene molar percent (% C4m). The slope GC4 is calculated from a linear regression.

Spectrum of the unknown sample is recorded and then (At), (AC2) and (DC4) of the unknown sample are calculated. The ethylene content (% molar fraction C2m) of the sample is calculated as follows:

$$\% \ C_2m = \frac{1}{GC_2} \times \frac{AC_2}{At}$$

The 1-butene content (% molar fraction C4m) of the sample is calculated as follows:

$$\% \, C_4 m = \frac{1}{GC_4} \times \left(\frac{AC_4}{At} - IC_4\right)$$

The propylene content (molar fraction C3m) is calculated as follows:

$$\% \, C_3 m = 100 - \% \, C_4 m - \% \, C_2 m$$

The ethylene and 1-butene contents by weight are calculated as follows:

$$\% \, C_2 \, \text{wt} = 100 \times \frac{28 \times C_2 m}{(56 \times C_4 m + 42 \times C_3 m + 28 \times C_2 m)}$$

$$\% \, C_4 \, \text{wt} = 100 \times \frac{56 \times C_4 m}{(56 \times C_4 m + 42 \times C_3 m + 28 \times C_2 m)}$$

Melt Flow Rate (MFR "L"): Determined according to ISO 1133 230° C., 2.16 kg.

Solubility in Xylene at 25° C.:

2.5 g of polymer and 250 ml of xylene are introduced in a glass flask equipped with a refrigerator and a magnetic stirrer.

The temperature is raised in 30 minutes up to the boiling point of the solvent. The obtained solution is then kept under reflux and stirring for further 30 minutes.

The closed flask is then kept for 30 minutes in a bath of ice and water and in thermostatic water bath at 25° C. for 30 minutes as well. The formed solid is filtered on quick filtering paper.

100 ml of the filtered liquid is poured in a pre-weighed aluminum container, which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

Flexural modulus: Determined according to the ISO 178 method.

Samples for the mechanical analysis: Samples were obtained according to ISO 1873-2:2007, except for the flexural modulus. The flexural modulus sample was prepared according to ISO 3167.

Haze (on 1 mm Plaque):

Five by five (5×5) cm specimens were cut molded plaques of 1 mm thick. The haze value is measured using a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze).

The measurement and computation principle are given in the norm ASTM-D1003.

The plaques were produced according to the following method. 5×5×1 mm plaques are molded with a GBF Plastiniector G235/90 Injection Molding Machine, 90 tons under the following processing conditions:

Screw rotation speed: 120 rpm
Back pressure: 10 bar
Melt temperature: 260° C.
Injection time: 5 sec
Switch to hold pressure: 50 bar
First stage hold pressure: 30 bar
Second stage pressure: 20 bar
Hold pressure profile: First stage 5 sec
Second stage 10 sec
Cooking time: 20 sec
Mold water temperature: 40° C.

The plaques were conditioned for 12 to 48 hours at relative humidity of 50% and temperature of 23° C.

Haze on container: The haze on container were measured by cutting a 5×5 cm specimens from the container wall and using the same above procedure for the haze (on 1 mm plaque).

Top Load:

After at least 70-hours conditioning at 23° C. and 50% relative humidity, the container was settled between the two plates of the dynamometer and compressed with a stress velocity of the plate of 10 mm/min.

The stress at collapse of the container is recorded and the value reported in N. The Top Load value is the mean value obtained from measurements repeated on 6 containers.

Container Impact Test (CIT)

The test was a biaxial impact test. The container, bottom up, was put on a sample older, having the same dimension of the container.

The plate for the impact has a diameter of 62 mm and 5 kg of weight. The plate fell from 600 mm. The results are expressed in Joule. The results are an average of 10 tests.

Containers to be Tested

Containers to be tested are produced with an injection moulding machine with the following specs:

Injection Moulding Unit Parameters:
Injection screw stroke: 1200 kN
Screw diameter: 32 mm
Injected volume: 102.9 cm3
Screw ratio L/D: 20
Max injection press: 2151 bar
The items to be tested must have the listed characteristics:
Volume: 250 cc
Surface treatment: Polished The shape of the container was a truncated pyramid with a square base, wherein the top base has a side of 70 mm and the bottom base has a side of 50 mm, the height being 80 mm IZOD Impact Strength: Determined according to ISO 180/1A. Samples have been obtained according to ISO 294-2.

The hexane extractables on powder: measured according to FDA 21 77:1520

Gloss: Determined on the same specimens as for the Haze.

The instrument used for the test was a model 1020 Zehntner photometer for incident measurements. The calibration was made by carrying out a measurement at incidence angle of 60° on black glass having a standard Gloss of 96.2% and a measurement at an incidence angle of 45° on black glass having a standard Gloss of 55.4%.

Examples 1-2 and Comparative Example 3
Preparation of the Solid Catalyst Component The propylene terpolymers were prepared by polymerizing propylene, ethylene, and butene-1 comonomers in the presence of a highly stereospecific Ziegler-Natta catalyst.

In example 1 and comparative example 3, the Ziegler-Natta catalyst was prepared according to the Example 5, lines 48-55 of the European Patent No. 728769, which is incorporated herein by reference in its entirety. Triethylaluminum (TEA) was used as co-catalyst and dicyclopentyldimethoxysilane as external donor, with the weight ratios indicated in Table 1.

For Example 2, the solid catalyst component was prepared as follows:

Into a 2000 mL five-necked glass reactor, equipped with mechanical stirrer, jacket and a thermocouple, purged with nitrogen, 1000 mL of TiCl4 were introduced and the reactor cooled at −5° C. While stirring, 60.0 g of microspheroidal MgCl2.1.7C2H5OH (having average particle size of 58 m and prepared in accordance with the method described in example 1 of European Patent No. 728769, which is incorporated herein by reference in its entirety) was added at −5° C.

The temperature was raised to 40° C. An amount of diethyl 2,3-diisopropylsuccinate was added to reach a Mg/succinate molar ratio of 16.5.

The temperature was raised to 100° C. and kept at this value for 60 min.

Stirring was stopped for 15 min, and the solid settled. The liquid was siphoned off.

After siphoning, fresh TiCl4 and an amount of 9,9-bis (methoxymethyl)fluorene were added to achieve a Mg/diether molar ratio of 33.

The temperature was raised to 110° C. and kept for 30 minutes under stirring. The reactor was then cooled at 75° C. and the stirrer was stopped for 15 min. After sedimentation and siphoning, fresh TiCl4 was added. Then the temperature was raised to 90° C. and the suspension was stirred for 15 min. The temperature was then decreased to 75° C. and the stirrer was stopped, for 15 min. After sedimentation and siphoning at the solid was washed six times with anhydrous hexane (6×1000 ml) at 60° C. and one time with hexane at 25° C. The solid was dried in a rotavapor.

Before introducing the catalyst system into the polymerization reactors, the solid catalyst components were contacted with aluminum-triethyl (TEAL) and dicyclopentyldimethoxysilane (DCPMS) at a temperature of 15° C.

The catalyst system was transferred into a reactor containing an excess of liquid propylene and propane to carry out prepolymerization at 25° C. for 11 minutes before introducing the catalyst system into a polymerization reactor.

The propylene terpolymers were prepared in a single gas-phase polymerization reactor comprising two interconnected polymerization zones, a riser and a downcomer, as described in the European Patent No. 782587 and Patent Cooperation Treaty Publication No. WO/2000/002929, which is incorporated herein by reference in its entirety.

Into the polymerization reactor, the propylene terpolymers were produced by feeding in a continuous and constant flow the prepolymerized catalyst system, hydrogen (used as molecular weight regulator), propylene, ethylene and butene-1 comonomers in the gas state (the feeding quantities expressed in mol % are shown in Table 1). The polymer particles exiting from the polymerization step were subjected to a steam treatment to remove the unreacted monomers and dried.

The other operative conditions are indicated in Table 1.

TABLE 1

|  |  | Example | | |
|---|---|---|---|---|
|  |  | Ex. 1 | Ex. 2 | Comparative Ex. 3 |
| TEAL/external donor | wt./wt. | 6 | 4 | 7 |
| TEAL/catalyst | wt./wt. | 6 | 5 | 8 |

TABLE 1-continued

|  |  | Example | | |
|---|---|---|---|---|
|  |  | Ex. 1 | Ex. 2 | Comparative Ex. 3 |
| Temperature | ° C. | 75 | 75 | 75 |
| Pressure | bar-g | 27 | 27 | 27 |
| Split riser | wt. % | 41 | 41 | 41 |
| holdup downcomer | wt. % | 59 | 59 | 59 |
| $C_4^-$ riser | mole % | 2 | 2.2 | 1.3 |
| $C_2^-$ riser | mole % | 0.5 | 0.47 | 0.56 |
| $H_2/C_3^-$ riser | mol/mol | 0.125 | 0.037 | 0.1 |
| $C_4^-/(C_4^- + C_3^-)$ | mol/mol | 0.035 | 0.034 | 0.019 |

$C_2^-$ = ethylene
$C_3^-$ = propylene
$C_4^-$ = Butene

The polymer particles of examples 1-2 and comparative example 3 were introduced into an extruder, wherein polymers were mixed with Irganox 1010 (0.05 wt. %), Irgafos 168 (0.1 wt. %), Ca stearate (0.5 wt. %), GMS 90 (0.13 wt. %), and NX8000 (0.2 wt. %). The polymer particles were extruded under nitrogen atmosphere in a twin-screw extruder, at a rotation speed of 250 rpm and a melt temperature of 200-250° C.

The sum of the additives and the polymer being 100 wt. %. The properties of the obtained material have been reported in Table 2:

TABLE 2

|  |  | Ex 1 | Ex 2 | Comp Ex 3 |
|---|---|---|---|---|
| C2 | % | 1.0 | 1.2 | 1.1 |
| C4 | % | 1.8 | 2.1 | 0.9 |
| C2/C4 |  | 0.56 | 0.57 | 1.22 |
| Total content C2 and C4 | % | 2.80 | 3.30 | 2.00 |
| XS | % | 2.8 | 3.6 | 2.8 |
| Characterization ISO | | | | |
| Melt Flow Rate | g/10' | 66 | 42 | 60 |
| Flexural Modulus | MPa | 1480 | 1450 | 1540 |
| Tensile Modulus | MPa | 1620 |  | 1680 |
| Haze (1 mm plaque) | % | 11.7 | 11.2 | 13.8 |
| GLOSS 60° | — | 124 | 127 | 120 |
| Izod Impact 23° C. | kJ/m² | 3.5 | 3.6 | 3.2 |
| Izod Impact 0° C. | kJ/m² | 2.6 | 1.1 | 1.6 |
| Izod Impact −20° C. | kJ/m² | 2.6 | 1.1 | 1.5 |
| Charpy Impact 23° C. | kJ/m² | 3.4 | 3.6 | 3.2 |
| Charpy Impact 0° C. | kJ/m² | 1.2 | 1.1 | 1.1 |
| Charpy Impact −20° C. | kJ/m² | 1.1 | 1.1 | 1.0 |
| Stress at yield | MPa | 36.5 | 35.2 | 36.2 |
| Elongation at yield | % | 10.6 | 10.7 | 10.2 |
| Stress at break | MPa | 18.6 | 18.8 | 27.3 |
| Elongation at break | % | 785 | 700 | 24 |
| Yellow Index | % | −3 | −3 | −3 |
| DSC Tm | ° C. | 149.7 | 150.3 | 151.8 |
| DSC Tc | ° C. | 115.3 | 116.2 | 117.3 |
| hexane extrac. Powder |  | 1.5 | 1.3 | 1.5 |
| Shrinkage (Long./Trasv.) | % | 1.46/1.62 | 1.44/1.54 | 1.47/1.63 |
| Container | | | | |
| Haze | % | 5.8 | 6.4 | 7.6 |
| Container Impact Test @ +23° C. | J | 2.2 | 2.0 | 1.0 |
| Container Impact Test @ 0° C. | J | 1.6 | 1.9 | 0.7 |
| Container Impact Test @ −20° C. | J | 1.2 | 1.2 | 0.7 |

It should be understood that various changes, substitutions and alterations can be made herein without departing from the spirit and scope of this disclosure as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

What is claimed is:

1. An article of manufacture comprising:
   (A) a propylene-based terpolymer comprising
      (I) a propylene, ethylene, 1-butene terpolymer having
         (i) ethylene-derived units in the range of from about 0.5 wt. % to about 1.8 wt. % ($C_2$ wt %), based upon the total weight of the propylene-based terpolymer;
         (ii) 1-butene-derived units in the range from about 1.6 wt. % to about 2.4 wt. % ($C_4$ wt %), based upon the total weight of the propylene-based terpolymer;
         (iii) a ratio of $C_2$ wt %/$C_4$ wt % in the range from about 0.40 to about 0.80; wherein $C_2$ wt % is the weight percent of ethylene derived units and $C_4$ wt % is the weight percent of 1-butene-derived units;
         (iv) a melt flow rate, MFR measured according to ISO 1133, 230° C., 2.16 kg in the range of from greater than 50 g/10 mins to about 80 g/10 mins;
         (v) a xylene soluble fraction at 25° C. lower than about 5.0 wt. % based on the total weight of the propylene-based terpolymer; and
         (vi) a melting point higher than about 140° C.

2. The article of manufacture according to claim 1 wherein the content of the ethylene-derived units is in the range from about 0.7 wt % to about 1.5 wt. %.

3. The article of manufacture according to claim 1 wherein the ratio of C2 wt %/C4 wt % is in the range from about 0.50 to about 0.70.

4. The article of manufacture according to claim 1 wherein melting point is in the range between about 140° C. and about 152° C.

5. The article of manufacture according to claim 1 wherein the propylene-based terpolymer has haze measured on 1 mm plaque lower than about 15%.

6. The article of manufacture according to claim 1 wherein the article is a container.

7. A propylene-based terpolymer comprising:
   (A) propylene monomers,
   (B) ethylene monomers, and
   (C) 1-butene monomers,
   Having
      (i) ethylene-derived units in the range of from about 0.5 wt. % to about 1.8 wt. % ($C_2$ wt %), based upon the total weight of the propylene-based terpolymer;
      (ii) 1-butene-derived units in the range from about 1.6 wt. % to about 2.4 wt. % ($C_4$ wt %), based upon the total weight of the propylene-based terpolymer;
      (iii) a ratio of $C_1$ wt %/$C_4$ wt % in the range from about 0.40 to about 0.80; wherein $C_2$ wt % is the weight percent of ethylene derived units and $C_4$ wt % is the weight percent of 1-butene-derived units;
      (iv) a melt flow rate, MFR measured according to ISO 1133, 230° C., 2.16 kg in the range of from greater than 50 g/10 mins to about 80 g/10 mins;
      (v) a xylene soluble fraction at 25° C. lower than about 5.0 wt. % based on the total weight of the propylene-based terpolymer; and
      (vi) a melting point higher than about 140° C.

* * * * *

UNITED STATES PATENT AND TRADEMARK OFFICE
CERTIFICATE OF CORRECTION

| | |
|---|---|
| PATENT NO. | : 10,550,212 B2 |
| APPLICATION NO. | : 15/511976 |
| DATED | : February 4, 2020 |
| INVENTOR(S) | : Destro et al. |

Page 1 of 1

It is certified that error appears in the above-identified patent and that said Letters Patent is hereby corrected as shown below:

On the Title Page

Column 1, Item (30), Line 1, delete "14186233" and insert -- 14186233.4 --, therefor In the Claims In Column 14, Claim 7, Line 25, delete "$C_1$" and insert -- $C_2$ --, therefor Signed and Sealed this
Eighth Day of November, 2022

Katherine Kelly Vidal
*Director of the United States Patent and Trademark Office*